United States Patent [19]
Adlhart

[11] Patent Number: 5,833,934
[45] Date of Patent: *Nov. 10, 1998

[54] DEMAND RESPONSIVE HYDROGEN GENERATOR BASED ON HYDRIDE WATER REACTION

[75] Inventor: Otto J. Adlhart, Fairlawn, N.J.

[73] Assignee: AF Sammer Corporation, Ringwood, N.J.

[*] Notice: The term of this patent shall not extend beyond the expiration date of Pat. No. 5,514,353.

[21] Appl. No.: 575,854

[22] Filed: Dec. 20, 1995

Related U.S. Application Data

[62] Division of Ser. No. 266,646, Jun. 28, 1994, Pat. No. 5,514,353.

[51] Int. Cl.⁶ ........................................................ B01J 7/00
[52] U.S. Cl. .............................................. 422/239; 48/61
[58] Field of Search .................................... 422/211, 219, 422/239; 48/61, 204; 123/3, DIG. 12; 423/646, 647, 657, 658.2; 429/19

[56] References Cited

U.S. PATENT DOCUMENTS

| | | |
|---|---|---|
| 3,649,360 | 3/1972 | Bloomfield et al. ...................... 429/19 |
| 4,155,712 | 5/1979 | Taschek ................................... 422/239 |
| 4,261,956 | 4/1981 | Bailey, Jr. et al. ...................... 422/239 |
| 4,548,044 | 10/1985 | Adlhart ................................... 422/239 |
| 4,826,741 | 5/1989 | Adlhart et al. ............................. 429/19 |
| 5,514,353 | 5/1996 | Adlhart ................................... 422/239 |

*Primary Examiner*—Christopher Kim
*Attorney, Agent, or Firm*—Dorn, McEachran Jambor & Keating; Vangelis Economou

[57] ABSTRACT

The reaction of alkali, alkali-earth metal hydride with water is utilized for the generation of hydrogen in a novel generator configuration. This overcomes the problems encountered in earlier hydride based generator configurations inasmuch as it overcomes the problem associated with the expansion of the hydride upon its conversion to hydroxide or oxide when reacting with water. This is accomplished by using a hydride cartridge of unique configuration. The combination of the corrugated cartridge structure and the wicking material dispersed throughout the cartridge facilitate the complete utilization of the hydride and water in a demand responsive mode. This is important in applications where intermediate hydrogen storage is impractical, as is the case in the use of these generators—e.g., for electric power generation in fuel cells in general and for Underwater Vehicles specifically because space restraints.

13 Claims, 4 Drawing Sheets

DEMAND RESPONSIVE HYDROGEN GENERATOR BASED ON HYDRIDE WATER REACTION

REFERENCE TO RELATED APPLICATIONS

This is a divisional application of application Ser. No. 08/266,646 filed on Jun. 28, 1994, U.S. Pat. No. 5,514,353.

BACKGROUND OF INVENTION

Hydrogen generator with improved demand control.

It has been known for some time that the reaction of alkali and/or alkali-earth metal hydrides is a convenient method of generating pure hydrogen for a variety of uses. One application which has been practiced for some time is the generation of hydrogen for filling of meteorological balloons. The calcium hydride water reaction has been relied upon for this application. Generators are commercially available. They provide instantaneous hydrogen with little if any control of the generation rate. A large surplus of water is applied to assure completion of the reaction.

More recently the interest in hydrogen generation from hydrides has increased because of the development of fuel cells, specifically Proton Exchange Membrane (PEM) fuel cells. The combination of these cells with hydrogen generators offers considerable advantages over primary and secondary batteries in terms of gravimetric and volumetric energy density and life cycle cost.

The use of these hydrogen generators with PEM fuel cells imposes increased need for demand/load responsive generator operation since intermediate hydrogen storage is for most purposes impractical. This need was recognized by the inventor and led to the development of a cartridge-type generator where calcium hydride particles were mixed with compressible foam sections and loaded into a metal tube. Water was admitted to this cartridge tube in a Kipp arrangement. A patent was granted—U.S. Pat. No. 4,261,956—for this arrangement, which provided some improvement over prior art generator concepts.

A main disadvantage of this hydrogen generator configuration, however, was the large excess of water required to bring the hydride conversion to completion. This is a significant negative in the Unmanned Underwater Vehicle (UUV) application, where during deployment water may not penetrate the hull of the vehicle nor may hydrogen gas be released. It is a particularly stringent condition that the fuel cell product water is consumed for the generation of hydrogen by reaction with certain selected hydrides, such as calcium hydride or lithium hydride, which generate stoichiometric quantities of hydrogen for the amount of fuel cell product water generated. It is in these applications in particular where the quantity of water available to complete the reaction is limited indeed.

The requirement may not be as stringent in other applications. However, the need for satisfactory load response and efficient reactant utilization remains always an important requirement to meet performance and cost objectives.

SUMMARY OF THE INVENTION

The foregoing and other deficiencies of the prior art are here overcome in a particularly useful, novel and unobvious way.

Each hydrogen generator is provided with a hydride cartridge comprising a corrugated perforated sheet metal support structure. It has two functions. The first is to disperse the hydride granules. The second equally important function is to accommodate the significant expansion which is taking place upon the reaction of hydride with water, which forms hydrogen gas and hydroxide.

It is yet another object of this invention to ease the transport of water within the cartridge body and assure the complete utilization of the hydride with the theoretically required quantity of water. This important function is provided by wicking materials. They are rolled up in sheet form with the corrugated, perforated sheet metal structure FIGS. 1 and 2). Alternatively, they are dispersed as fibers throughout the cartridge structure (FIGS. 3 and 5). The wicking material in fiber or sheet form assures rapid contact of liquid water with the hydride particles. Furthermore, it facilitates transport of water to the unreacted hydride even after part of the hydride has been reacted. At this point the hydride particles are covered with hydroxide, which would otherwise impair water access and complete conversion.

Yet another object of this invention is that water for the reaction is admitted to the cartridge under pressure and the heat is transferred to the generator walls for dissipation.

It is an additional objective of this invention to generate hydrogen in a completely passive mode under pressure. For this purpose hydride and water are stored in separate cartridges. The hydride cartridge is covered with a microporous hydrophilic membrane. Upon assembly of the hydride cartridge and water cartridge (holding water stored in a macroporous structure) water is wicked through the microporous membrane into the hydride cartridge generating hydrogen. By virtue of the bubble pressure of the microporous membrane, the hydrogen cannot enter the water cartridge. Consequently, hydrogen pressure is building up in the hydride cartridge forcing water back into the water cartridge unless the hydrogen formed is consumed.

The demand (load) responsive hydrogen generator according to the invention includes a generator container, a hydride cartridge comprising a corrugated perforated structure for the dispersion of the hydride particles and wicking material for the transport and distribution of water to the hydride particles.

The hydrogen generator is integrated with a water delivery system, which is a matter of choice. It may consist of a water storage reservoir from which water is pumped or forced by compressed gas including hydrogen into the hydrogen generation reactor.

Alternatively, the water may be wicked from a water storage cartridge into the hydride storage cartridge. By means of a microporous hydrophilic membrane placed between the cartridges, hydrogen may be generated under pressure in a completely passive mode, as water can readily pass the hydrophilic membrane but the hydrogen gas is kept from doing so by virtue of the bubble pressure of the hydrophilic membrane.

Heat dissipation also is an important element of the hydrogen generator. For small generators natural convection will suffice in most instances.

Complete utilization of water and hydride is an important element of the invention. It is critical in underwater vehicular applications. In this specific case, fuel cell product water is utilized for hydrogen generation. Preferably, hydrides forming stoichiometric volumes of hydrogen when reacting with water are utilized. Examples of such hydrides are lithium hydride and calcium hydride.

The first provides a very high-energy density. The latter, while heavier, offers the addition of advantage of releasing hydrogen essentially water free. In an effort to assure complete utilization of the fuel cell product water, it is advantageous to feed the moist hydrogen generated by reaction of lithium hydride with water through a calcium hydride containing hydrogen generator. This arrangement alleviates the need for water recovery.

BRIEF DESCRIPTION OF THE DRAWING FIGURES

The foregoing and other features and advantages will appear more fully from drawings which accompany this writing and wherein:

FIG. 1 is a perspective view of one embodiment of a hydride cartridge assembly according to the present invention, [consisting of a rolled structure of corrugated and perforated sheet metal element 1, wicking material 2, corrugated sheet metal shroud 3 and perforated water distribution tube 4];

DETAILED DESCRIPTION OF THE PREFERRED EMBODIMENTS

Figure 1:
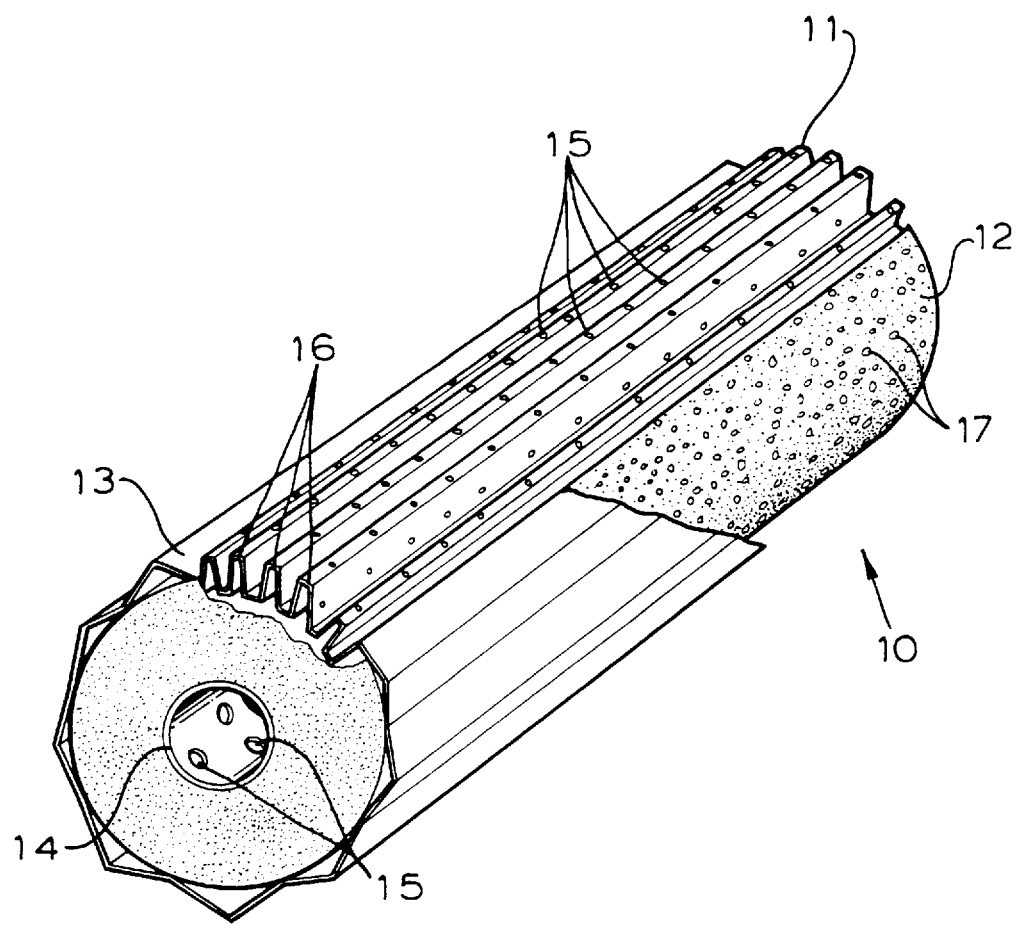

FIG. 1 is a perspective view of a hydride cartridge assembly 10 consisting of a rolled structure of corrugated and perforated sheet metal element 11, wicking material 12, corrugated sheet metal shroud 13, and perforated water distribution tube 14. FIG. 1 shows a preferred hydride cartridge 10 including a plurality of corrugated perforated sheet metal elements 11 and layers of water wicking material 12 with hydride particles 17 dispersed throughout the structure.

Figure 2:
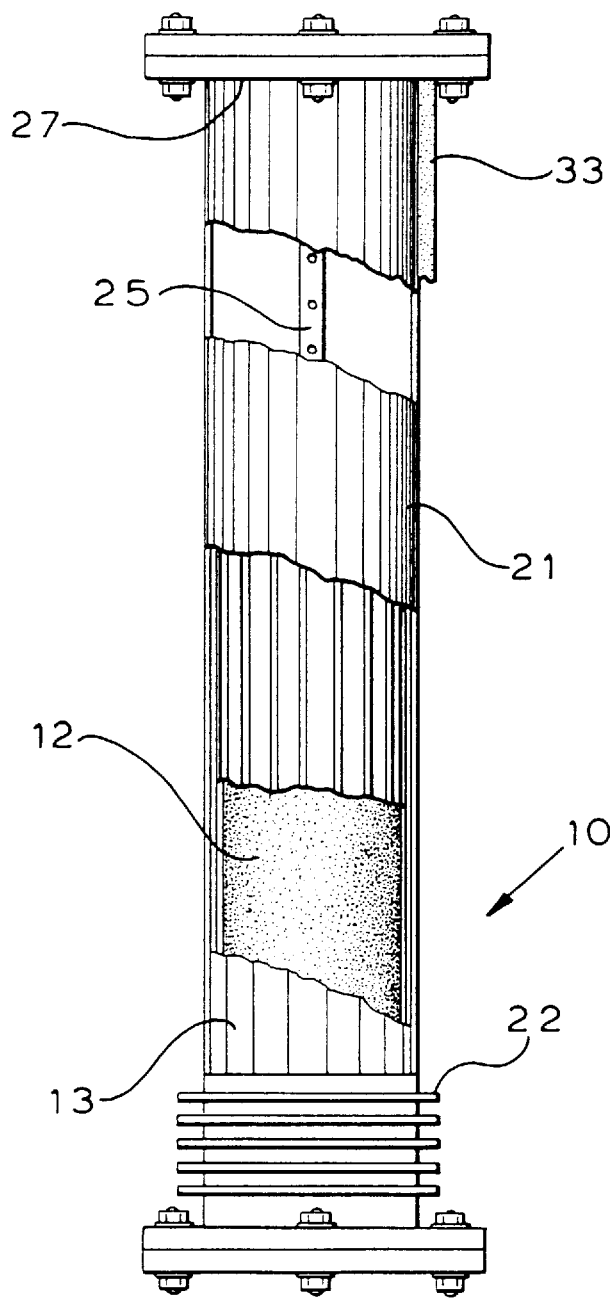
FIG. 2 is a schematic partial cut-away view of the hydrogen generator assembly consisting of the generator housing, the hydride cartridge and means of water distribution and/or heat dissipation.

FIG. 2. shows the layers of corrugated perforated sheet metal and the wicking material 12 as may be stacked or rolled into a circular configuration to fit into a thin wall tubular 21 or rectangular (not shown) stainless steel or aluminum housing 27 which is equipped with fins 22 for heat dissipation or surrounded by a metal shroud 13 for cooling by a liquid coolant or conduction to a heat sink (not shown).

Several hydride cartridges 10 may be positioned into a metal tube of sufficient length and supplied with water through a perforated water feed tube 25 located in the center of the hydride cartridge 10.

Furthermore, to ease the charging of the virgin cartridge into the reactor and removal of the converted cartridge from the reactor, the hydride cartridge 10 is surrounded by a corrugated sheet metal shroud 13.

Figure 3:
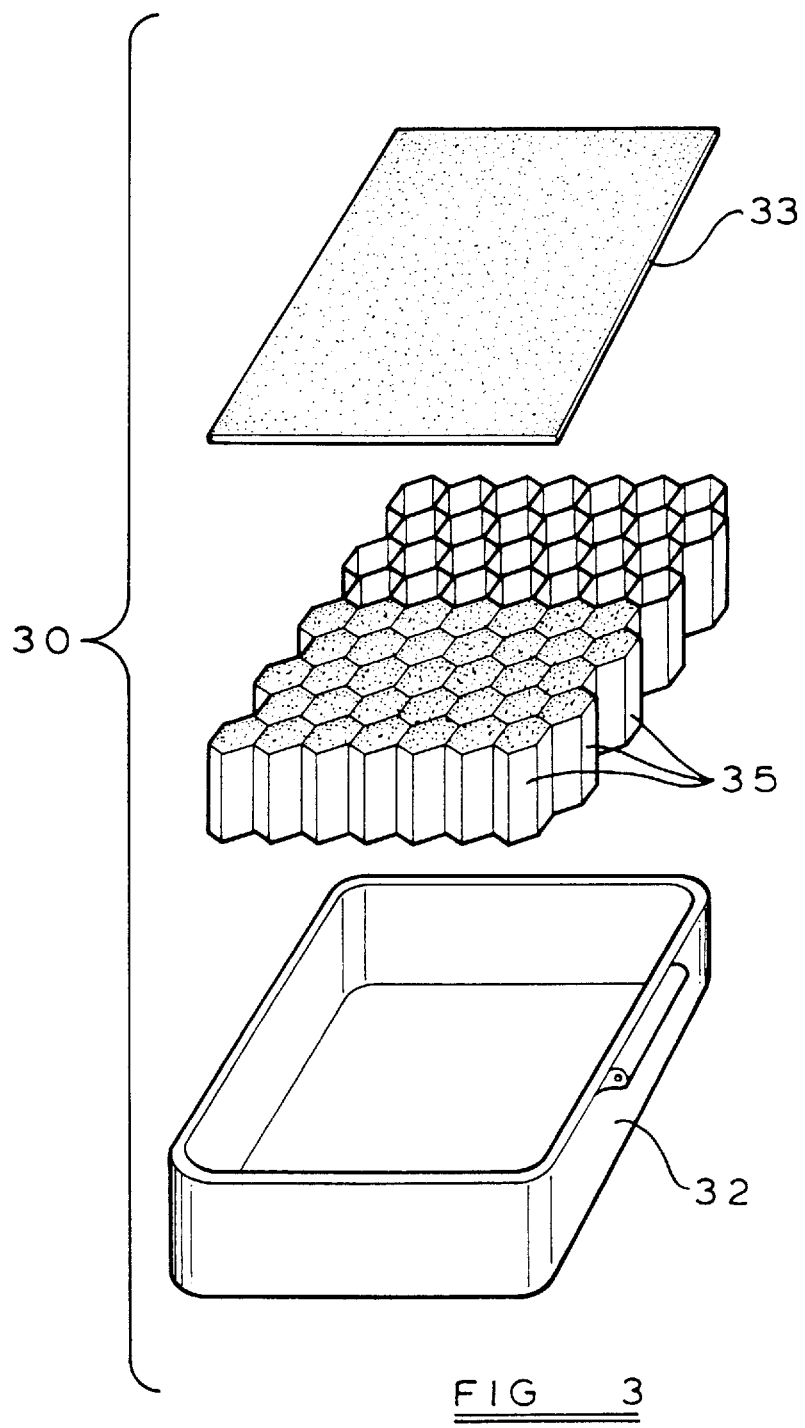
FIG. 3 is an exploded view of a second embodiment of the hydrogen generator according to the present invention.

FIG. 3 is an exploded view of a hydrogen generator 30 consisting of plural hydride cartridges 35 and a container 32 where the hydride cartridges 35 are covered by a microporous hydrophilic membrane 33 which allows water passage from a water storage reservoir 42 (FIG. 4) but prevents hydrogen passage therethrough.

Figure 4:
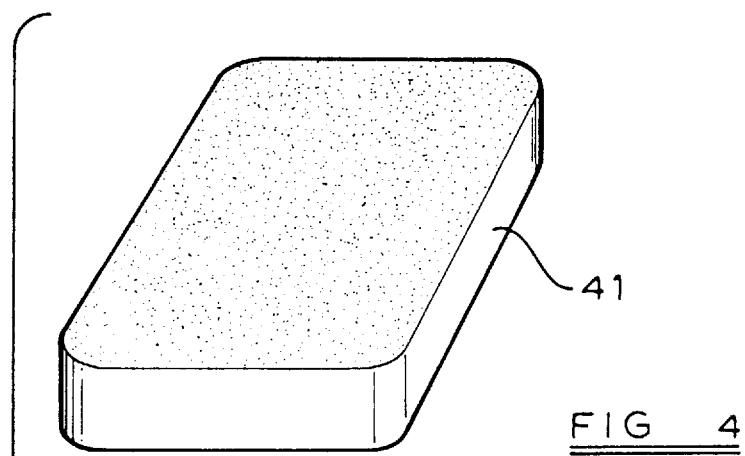
FIG. 4 is an exploded view of the water storage section according to the present invention.

FIG. 4 is an exploded view of a water storage section 40 consisting of water storage cartridge 41 and the water storage reservoir 42 for use with the hydrogen generator 30 (FIG. 3).

Figure 5:
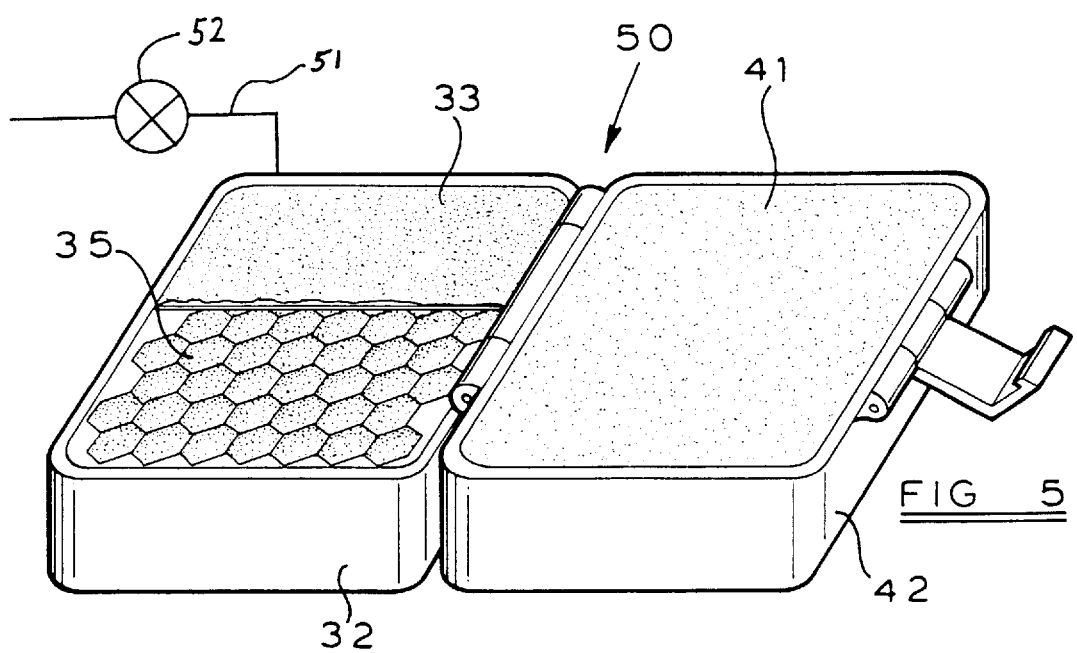
FIG. 5 is a perspective view of the integrated passive hydrogen generator assembly shown separately in FIGS. 3 and 4.

FIG. 5 is a perspective view of the integrated passive hydrogen generator assembly 50 comprising the hydride cartridge section 30 and the water storage section 40 and the microporous hydrophilic membrane 33 separating these sections.

EXAMPLE 1

A hydrogen generator has been constructed with a hydride cartridge as in FIG. 1. having dimensions of 6" length and 3.75" diameter using 0.006" thick magnesium foil. The foil is perforated with holes 15 of 0.043" diameter. Ten percent (10%) of the foil area is removed by perforations. Subsequently, the foil area is corrugated with fins 16 of 0.25" height with a spacing of 12 fins/inch. A 6" wide 24" long foil strip is combined with a sheet of carefully degreased graphite cloth 12, known as Thornel WCA and manufactured by Amoco, having a thickness of approximately 0.02 inches, and dimensions comprising 24" length and 6" width.

Subsequently, the components are rolled up into a structure with the dimensions stated above and charged with 400 gm of 95% pure −30 mesh Lithium Hydride, manufactured by FMC Lithium, and then surrounded by a shroud 13 of corrugated 0.005" stainless steel sheet.

The cartridge 10 is inserted into a stainless steel reactor purged with nitrogen to remove air before water is pumped at an average rate of approximately 53 gm/hr. into the generator. Hydrogen was generated at an average pressure or 50 psig. The rate of hydrogen generation was measured in a wet test meter after release from the reactor and drying of the hydrogen stream in a Drierite column. From the weight increase of the Drierite, the moisture content was determined to be 7%.

Periodically, the admission of water to the reactor was interrupted and the time interval was recorded for a significant change in hydrogen pressure to take place. Conversely, upon readmission of water to the reactor, the time was also recorded that was required for a significant increase in pressure to take place.

The response time, instantaneous at the beginning of the discharge, slowly decreased as the test progressed, as shown in Tables 1 and 2 below.

TABLE 1

| | Start-up Data | |
| --- | --- | --- |
| Hydride % utilization | Time (min) for >10 psi change | Pressure Changes |
| 0% | <5 min | 50 psi |
| 11.75% | 5 min | 15 psi |
| 18.00% | 5 min | 10 psi |
| 23.43% | 10 min | 17 psi |
| 38.70% | 10 min | 19 psi |
| 50.00% | 10 min | 19 psi |
| 60.00% | 10 min | 10 psi** |
| 70.00% | 5 min | 40 psi |
| 78.26% | 10 min | 13 psi |
| 90.00% | 5 min | 40 psi |

TABLE 2

Shut-down Data

| Hydride % utilization | Time (min) for 10 psi change | Pressure Changes |
|---|---|---|
| 10.00% | 20 min | 12 psi |
| 16.43% | 90 min | 10 psi |
| 21.50% | 60 min | 10 psi |
| 34.41% | 100 min | 10 psi |
| 47.90% | 120 min | 10 psi |
| 57.96% | 150 min | 0 psi** |
| 63.84% | 105 min | 16 psi |
| 75.80% | 20 min | 10 psi |
| 96.01% | 60 min | 10 psi |

**Indicates the time when reactor temperature was raised from 150° C. to 180° C.

The total volume of hydrogen gas generated by reacting 400 gm Lithium Hydride of 95% purity with water was 1075 liters (standard conditions). The quantity of water consumed was 864 gm., indicating a complete utilization of water and hydride in a stoichiometric ratio.

EXAMPLE 2

The hydrogen generator of Example 1 is tested with 298 gm of 95% pure Calcium Hydride under the same conditions as in Example 1. The moisture content of the hydrogen released was measured in a MEECO Inc. moisture analyzer. The moisture content was found to be less than 100 ppm.

The hydrogen generated increased accordingly as the residual moisture in the hydrogen released from the Lithium Hydride containing generator is converted to Calcium Hydroxide and hydrogen. The test was terminated after 1130 liters of hydrogen (standard conditions) had been generated, indicating a 17% conversion of the Calcium Hydride charge.

EXAMPLE 3

In this example Lithium Aluminum Hydride was used for the generation of hydrogen in the passive generator assembly illustrated in FIG. 5. It is converted upon reaction with water into Lithium Meta Aluminate and hydrogen. Four mols of Hydrogen are generated from each mol of Hydride. Although theoretically 2 mols of water should suffice to complete the conversion, in actuality twice as much water is required because of the formation of Hydrates.

In Example 3, the hydride was contained in a cartridge of similar construction as in Example 1. The depth of the hydride bed, however, was only ⅜" rather than 6" and 0.005" corrugated, perforated aluminum foil was used for the construction of the cartridge. For water wicking, common Schleicher & Schuell Filter paper was rolled up with the corrugated aluminum structure into a cartridge assembly of 4" diameter. The cartridge was positioned in an Epoxy reactor body filled with 45 g of [−]30 mesh Lithium Aluminum Hydride of 95% purity and covered with a Nylon membrane of 2 micron pore size.

The water for the reaction was stored in a water cartridge made up of Scott Paper Company's "WYPALL" 5701 toweling, which was positioned in the water storage compartment 42 of the hydrogen generator assembly 50 and contained 25 g water.

Immediately after assembly of the hydride and water sections of the passive hydrogen generator, hydrogen generation commenced. Initially, the hydrogen was released to purge any entrapped air. Subsequently, the pressure was allowed to build up to 20 psig., considerably higher than necessary for the operation of the PEM fuel cell. At this point pressure increase ceased, indicating water was kept from entering the hydride compartment of the generator and water was forced back into the water storage compartment. Subsequently, hydrogen was released from the reactor at an hourly rate of 11 liters corresponding to 20 watts, assuming a PEM cell operating point of 0.76 V/cell.

After 2 hours of operation, during which the pressure was allowed to climb several times by stopping hydrogen withdrawal, the test was discontinued because the flow rate of 11 liters/hr could not be maintained. Inspection of the reactor indicated unreacted hydride but also indicated depletion of the water in the water storage compartment.

Whereas Example 3 clearly illustrated the demand (load) responsive operation of the hydrogen generator, the quantity of water provided for the completion of the reaction obviously has to be optimized.

We claim:

1. A load responsive hydrogen generator for releasing hydrogen gas from a particle hydride bed as demand for hydrogen warrants, said hydrogen generator comprising:

a) an enclosed housing adapted for containing hydrogen gas under pressure;

b) a hydride storage compartment disposed within said housing for storing a mass of hydride particles dispersed within said housing, and further including a corrugated, perforated support structure adapted to accommodate volumetric expansion of said mass of said hydride particles upon conversion of hydride to hydroxide;

c) a liquid water storage structure including a hydroporous water absorbent material for storing liquid water;

d) a liquid water transfer means disposed between said liquid water storage structure and said hydride storage compartment for permitting passage of said liquid water from said liquid water storage structure to said hydride storage compartment;

e) a distribution means for receiving said liquid water from said liquid water transfer means and for distributing said liquid water directly to said hydride particles thereby permitting the hydriding reaction to generate hydrogen gas into said hydride storage compartment; and f) a gas communication means for removing said hydrogen gas from said hydride storage compartment upon load demand.

2. The load responsive hydrogen generator according to claim 1 wherein said distribution means further comprises a liquid water wicking member.

3. The load responsive hydrogen generator according to claim 2 wherein said water wicking member is an inorganic fiber.

4. The load responsive hydrogen generator according to claim 2 wherein said water wicking member is an organic fiber.

5. The load responsive hydrogen generator according to claim 1 wherein said corrugated, perforated support structure comprises a corrugated and perforated metal.

6. The load responsive hydrogen generator according to claim 1 wherein said hydride particles further comprise a compound selected from the group of alkali and alkali-earth metal hydrides.

7. The load responsive hydrogen generator according to claim 1 wherein said hydride particles further comprise calcium hydride.

8. The load responsive hydrogen generator according to claim 1 wherein said hydride particles further comprise lithium hydride.

9. The load responsive hydrogen generator according to claim 1 wherein said hydride particles are embedded in a wicking material.

10. The load responsive hydrogen generator according to claim 1 wherein said corrugated, perforated support structure is metallic.

11. A hydrogen generator according to claim 1 wherein the hydride storage compartment is equipped with a hydrogen relief valve.

12. A hydrogen generator according to claim 1 wherein the hydride storage structure is shaped, configured and adapted to receive said liquid storage structure, and said liquid storage structure is configured as a disposable cartridge.

13. The load responsive hydrogen generator according to claim 1 wherein said liquid water storage structure comprises a disposable water cartridge made of cellulosic fiber and the quantity of water contained therein before hydrogen generation commences is in excess of that required for the complete conversion of the hydride held in the hydride cartridge.

\* \* \* \* \*